3,518,305
NITRO-TRIFLUOROMETHYLBENZAMIDES
Dean E. Welch, 800 Beck St., and Robert R. Baron, 3009
 Clark St., both of Charles City, Iowa 50616
No Drawing. Filed Aug. 14, 1967, Ser. No. 660,179
Int. Cl. C07c *103/22*
U.S. Cl. 260—558         9 Claims

ABSTRACT OF THE DISCLOSURE

A new series of nitro-trifluoromethylbenzamides and feed compositions containing the same to be used for the prevention and control of coccidiosis in animals.

---

This invention relates to the veterinary arts and more particularly to novel chemical compounds, compositions containing and methods of applying the same in the treatment and control of coccidiosis.

Coccidiosis is a communicable gastro-intestinal disorder and occurs in many animal species. It is especially prevalent in poultry and may be produced by a variety of protozoan parasites. The more important species of the pathogenic series are: *Eimeria tenella, Eimeria necatrix, Eimeria acervulina,* and *Eimeria brunetti.* The pathological conditions created by this disease are of a diverse nature and may range from lingering syndromes of morbidity and emaciation to a heavy toll of fatalities depending on the virulence of the respective parasite and the impact of the infection. Coccidiosis, therefore, causes serious financial losses to the poultry industry in that the market value of the afflicted birds is considerably diminished and the flock population quite frequently decimated. Also, the epizootic often strikes in form of multiple infections which progress concomitantly and aggravate the deterioration of a flock beyond redemption. Early prophylactic control of the disease is therefore imperative and the remedies desired for this purpose should not only have a high potency at subtoxic levels and low concentrations, but also develop a broad spectrum of efficacy against the most common species of coccidia.

We have discovered a new series of organic compounds which are possessed of such valuable therapeutic properties both in respect of their high potency and their wide range of coccidiostatic action. Our new compounds may be generically described as derivatives of nitro-trifluoromethylbenzamides of the following configuration

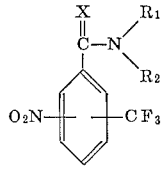

wherein X may be oxygen or sulfur, $R_1$ and $R_2$ may be either identical or different and stand for hydrogen, alkyl, alkenyl, halogen-substituted alkyl, halogen-substituted alkenyl, lower alkoxy-substituted alkyl, and lower alkoxy-substituted alkenyl groups. Preferred structures within the general purview of our invention are compounds in which the trifluoromethyl- and nitro-substituents in the benzene ring are paired in the 3,5-, the 2,4- and the 3,4-positions as represented by the formulae:

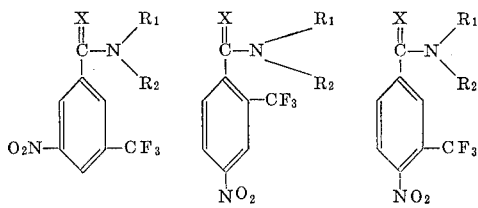

The following compounds are listed as representative members of the series of nitro-trifluoromethylbenzamides within the scope of our invention:

3-trifluoromethyl-5-nitrobenzamide
3-trifluoromethyl-N-methyl-5-nitrobenzamide
3-trifluoromethyl-N,N-dimethyl-5-nitrobenzamide
3-trifluoromethyl-N-ethyl-5-nitrobenzamide
3-trifluoromethyl-N,N-diethyl-5-nitrobenzamide
3-trifluoromethyl-N-allyl-5-nitrobenzamide
3-trifluoromethyl-N-(2-chloroethyl)-5-nitrobenzamide
3-trifluoromethyl-N-(2-methoxyethyl)-5-nitrobenzamide
3-trifluoromethyl-5-nitro-thiobenzamide
3-trifluoromethyl-4-nitrobenzamide
2-trifluoromethyl-4-nitrobenzamide The 3-trifluoromethyl-5-nitrobenzamide and its N-substituted derivatives may be conveniently prepared by halogenation of 3-trifluoromethyl-5-nitrobenzoic acid and subsequent reaction with $NH_4OH$ or the corresponding amine. The starting material may be obtained in accordance with the method described by Hauptschein et al. in J. Am. Chem. Soc. 76, 1051 (1954).

Members of the 2-trifluoromethyl-4-nitrobenzamide series are similarly produced from the precursory benzoic acid the synthesis of which is described in U.S. Pat. No. 3,052,603.

The 3-trifluoromethyl-4-nitrobenzamide is derived from the corresponding nitrile by reaction with hydrogen peroxide in an alkaline medium. The nitrile is formed according to the method of Caldwell et al. outlined in J. Am. Chem. Soc. 73, 5125 (1951).

In order to produce the thiobenzamides of the above-given configuration the corresponding benzamides are reacted with phosphorus pentasulfide whereby the oxygen in the benzamide group is exchanged for a sulfur atom.

The following examples will illustrate in greater detail the synthesis of a number of typical representatives of our new anticoccidial compounds.

EXAMPLE 1

3-trifluoromethyl-5-nitrobenzamide 50 grams (0.211 mole) of 3-trifluoromethyl-5-nitrobenzoic acid are added to 72 ml. of thionyl chloride and the mixture is heated at reflux for a period of 4 hours. The mass is thereupon cooled and, after the removal in vacuo of unreacted thionyl chloride, quenched in 1 liter of 30% ammonium hydroxide. The resulting precipitate is separated by filtration, washed with water and dried. It accrues in an amount of 37.4 grams or 76% of the theory. The material is a solid, white and odorless substance with a melting point of 139–140° C. Upon analysis it was found to contain:

Carbon _____ 41.07 (calculated value 41.03)
Hydrogen _____ 2.16 (calculated value 2.15)
Nitrogen _____ 11.94 (calculated value 11.97)
Fluorine _____ 24.04 (calculated value 24.34)

EXAMPLE 2

3-trifluoromethyl-N-methyl-5-nitrobenzamide 38 grams (0.61 mole) of 3-trifluoromethyl-5-nitrobenzoic acid are added to 150 ml. of freshly distilled thionyl chloride and the mixture is heated at reflux for a period of 4 hours. The excess of thionyl chloride is removed in vacuo and the viscid residue is added to a mixture of 30.4 ml. (0.35 mole) of 40% monomethylamine, 15 grams of sodium bicarbonate and 75 ml. of water. The resulting suspension is heated for one hour at 80–90° C., chilled and filtered. The residue is washed with water and recrystallized from aqueous denatured alcohol. The compound is collected in an amount of 31 grams or 77.5%

EXAMPLE 3

3-trifluoromethyl-N,N-dimethyl-5-nitrobenzamide 3-trifluoromethyl-5-nitrobenzoic acid is reacted with thionyl chloride in the same manner and proportions as in Example 2. After the removal of residual $SOCl_2$ the viscous mass is added to 45 grams of 30% dimethylamine (0.35 mole) and 15 grams of sodium bicarbonate dissolved in 75 ml. of water. The resulting mixture is heated at 60° C. for one hour, cooled and filtered. The compound accrues as a solid white substance in a yield of 30.7 grams or 73% of the theory. It has a melting point of 55–57° C.

EXAMPLE 4

3-trifluoromethyl-N-ethyl-5-nitrobenzamide 3-trifluoromethyl-5-nitrobenzoic acid is chlorinated as in Example 2. After the removal of the residual thionyl chloride the mass is quenched in a mixture of 48 grams of 33% ethylamine (0.35 mole), 15 grams of sodium bicarbonate and 75 ml. of water. It is thereupon heated for one hour at 60–70° C., cooled and filtered. After recrystallization from aqueous denatured alcohol the product is obtained as a solid white material in an amount of 9.5 grams or 22% of the theory. Its melting point is 98–101° C.

EXAMPLE 5

3-trifluoromethyl-N,N-diethyl-5-nitrobenzamide 3-trifluoromethyl-5-nitrobenzoic acid is chlorinated as in Example 2. After the removal of residual thionyl chloride the mass is quenched in a mixture of 25.6 grams (0.35 mole) of diethylamine, 15 grams of sodium bicarbonate and 75 ml. of water at a temperature below 50° C. The mass is then heated for one-half hour at 70° C., cooled and the oily layer is extracted with chloroform. The extract is dried over anhydrous magnesiumsulfate, freed of chloroform in vacuo and the oily residue is distilled. The new substance is a pale yellow liquid with a boiling point of 140–145° C./15 mm. It accrued in an amount of 41.7 grams or 89% of the theory.

EXAMPLE 6

3-trifluoromethyl-N-allyl-5-nitrobenzamide 40 grams (0.172 mole) of 3-trifluoromethyl-5-nitrobenzoic acid are treated under reflux with 140 ml. of thionyl chloride for 4 hours. After the removal of excess thionyl chloride in vacuo the mass is quenched in a mixture of 11.4 grams (0.20 mole) of monoallylamine, 60 grams of sodium bicarbonate and 250 ml. of water. The resulting suspension is heated for one-half hour at 50° C., cooled and filtered. The residue is washed with water and dried. The new compound is obtained as a solid white material in an amount of 37.5 grams or 79.5% of theory. It has a melting point of 68–70° C.

EXAMPLE 7

3-trifluoromethyl-N-(2-chloroethyl)-5-nitrobenzamide 31 grams (0.131 mole) of 3-trifluoromethyl-5-nitrobenzoic acid are refluxed with 150 ml. of thionyl chloride for 4 hours. The excess thionyl chloride is removed in vacuo and the mass is quenched in a mixture of 19.6 grams (0.17 mole) of beta-chloroethylamine hydrochloride, 75 grams of sodium bicarbonate and 250 ml. of water. The resulting suspension is heated for one-half hour at 40° C., cooled and filtered. After washing and drying the substance is recovered as a white solid material in an amount of 31.7 grams or 82% of the theory. It has a melting point of 87–90° C.

EXAMPLE 8

3-trifluoromethyl-N-(2-methoxyethyl)-5-nitrobenzamide 3-trifluoromethyl-5-nitrobenzoic acid is treated as in Example 6 and after the removal of the residual chlorinating agent, the mass is poured into a mixture of 18.8 grams of 2-methoxyethylamine, 15 grams of sodium bicarbonate and 75 ml. of water. The mixture is heated for one hour at 60° C., cooled and filtered. The precipitate is recrystallized from a mixture of water and ethanol and yields 24.2 grams or 48.5% of the theory of a white solid substance with a melting point of 75.5 to 77.5° C. Upon analysis it was found to contain:

| | |
|---|---|
| Carbon | 45.23 (calculated value 45.21) |
| Hydrogen | 3.85 (calculated value 3.80) |
| Nitrogen | 9.55 (calculated value 9.59) |
| Fluorine | 19.15 (calculated value 19.50) |

EXAMPLE 9

3-trifluoromethyl-5-nitrothiobenzamide 6.9 grams of 3-trifluoromethyl-5-nitrobenzamide as prepared by the method in Example 1 are heated to 120° C. in 50 ml. of xylene and mixed with 3.3 grams of phosphorus pentasulfide. The mixture is kept at a temperature of 110° C. for 30 minutes, filtered hot and the insoluble portion is washed with xylene and the filtrates are combined. The resulting solution is purified with charcoal and cooled. A precipitate is collected and air-dried yielding 3.7 grams of a yellow solid with a melting point of 99–116° C. The filtrate is concentrated in vacuo to a solid residue. A second crop of 0.8 gram with a melting point of 108–118° C. is obtained by recrystallization of the residue from aqueous denatured alcohol, bringing the yield to a total of 4.5 grams or 60% of the theory. Several recrystallizations give a melting point of 131.5–132.5° C. Upon analysis the compound was found to contain:

| | |
|---|---|
| Carbon | 38.70 (calculated value 38.40) |
| Hydrogen | 2.14 (calculated value 2.01) |
| Nitrogen | 11.37 (calculated value 11.20) |
| Fluorine | 22.89 (calculated value 22.78) |
| Sulfur | 12.74 (calculated value 12.81) |

EXAMPLE 10

3-trifluoromethyl-4-nitrobenzamide 4 grams of 3-trifluoromethyl-4-nitrobenzonitrile are mixed with 15 ml. of 190 proof ethanol and 1 ml. of 6 N NaOH. This mixture is treated dropwise with 10 ml. of 30% hydrogen peroxide at a temperature of 35–50° C. and then stirred for 2 hours at 50° C. A solid precipitate with release of oxygen is formed. The mass is diluted with 25 ml. of water, cooled and filtered. The filter residue is washed with water and dried. The substance is collected as a white solid in an amount of 3.4 grams or 76.4% of the theory and has a melting point of 136–138° C.

EXAMPLE 11

2-trifluoromethyl-4-nitrobenzamide 39 grams of 2-trifluoromethyl-4-nitrobenzoic acid are treated with 150 ml. of thionyl chloride under reflux for 3 hours. After the removal of the excess $SOCl_2$ in vacuo the mass is quenched in cold concentrated ammonia under stirring for a short period of time. The product is then filtered and washed with water. It is recrystallized from aqueous denatured alcohol and accrues in tan colored solid crystals with a melting point of 190–192° C. in a yield of 33 grams or 84.4% of the theory.

In accordance with our invention the above-described coccidiostats which are readily acceptable to the animals and at their effective dosage levels do not adversely interfere with their physiological functions are advantageously applied by introducing the same into the animal organism in any form or manner in which they are capable of forming and maintaining an effective blood or tissue level. This can be accomplished by injection or by dispensation of suitable dosage units in capsules or tablets of conventional composition. As a preferred embodiment, however, the compounds are administered to the animals in combination with a solid, inert, non-toxic carrier material in which they are uniformly and homogeneously dispersed. Such inactive vehicles of ingestible nature are any kind of vegetable food material like ground corn, corn meal, dried distiller's grain, citrus meal, ordinary grain, mash, scratch, and any other normal or commercial rations. The so medicated feed is placed before the birds for consumption ad libitum. The compounds may also be used as active ingredients in liquid compositions which can be conveniently prepared by means of drinking water in which they are either dissolved or suspended with the help of skim milk, edible oils, syrups or commercial wetting agents and emulsifiers.

The new drugs are principally, though not exclusively, intended for prophylactic purposes to prevent the eruption and spread of a latent infection and as such are to be fed on a continuous schedule. When, for instance, an impending outbreak of coccidiosis in a mature flock is suspected by reason of exposure or a sporadic appearance of the first clinical symptoms of the disease, the remedies are administered to the birds approximately for 2–3 weeks, but treatment may be extended for a longer period if the infection is of more serious nature.

As previously set forth, our new chemotherapeutic agents have been found of principal use in the control of 4 prevalent coccidiogenic parasites which include the bloody cecal species *Eimeria tenella*, the bloody intestinal species or *Eimeria necatrix*, the so-called "chronic intestinal" species *Eimeria acervulina*, and the catarrhal intestinal species *Eimeria brunetti*. Depending on the nature and origin of the infection the minimum dosages for effective control may be as low as 0.00625% or 62.5 parts per million in the feed as for the prevention of *E. tenella*. In the case of other species or multiple infections the amount may have to be doubled or progressively increased and it has been ascertained that dosages up to 0.1% can be dispensed without untoward reactions. It will likewise be understood that the posological requirements will vary with the potency of the individual members of our new series of compounds as will appear in greater detail from the tables below summarizing the experimental results.

The utility of our new veterinary remedies has been illustrated by testing their prophylactic action against avian coccidiosis of various etiological sources. For each test either broiler-type heavy-breed birds or hybrid Leghorn chicks in groups of 4 were reared in electrically heated brooding batteries, and particular care was taken to protect the animals against extraneous exposure to coccidia and other infective organisms. At 4 to 6 weeks of age the birds were placed in individual cages which had been thoroughly cleaned and disinfected. Feed and water cups were sterilized with steam. The birds were observed for 1 to 2 days for possible sickness. Unhealthy specimens were replaced by wholesome substitutes. During the observation period the chicks became adjusted to their new environment and acquired test-fitness. Each chick was weighed starting from the day of the experiment. The birds were then moved from one cage to another so as to ensure approximate equality of the mean weights of each test group.

The coccidiosis cultures used in these experiments had been serially propagated over a period of several years. These cultures were started from single oocyst isolates and were grown in coccidia-free birds to ensure their purity. They were periodically subcultured to maintain their virulence. For artificial infection a single close of about 100,000 sporulated oocysts of *E. tenella, E. necatrix*, and 200,000 oocysts of *E. brunetti* were given to each chick, while the infective amount of *E. acervulina* was approximately 5,000,000 sporulated oocysts. Inocluation was carried out by depositing a predetermined volume of a calibrated oocyst suspension directly into the crop of each chick. Treatment by medicated rations was initiated 2 or 3 days before infection and extended over a period of 10–14 days depending upon the coccidiogenic species involved.

The criteria of anticoccidial efficacy in these experiments were (1) the percentage ratio of mean weight gains or losses, (2) the fecal score, and (3) the rate of mortality. The readings in each of the three categories were compared with those of infected, but untreated chicks which served as controls.

The percentage ratio of mean weight variations is an index of the degree of morbidity induced by the stress of the infection. The extent of the counteracting effect of the drug reflects its therapeutic value. The readings are taken during the 10 to 14 day period of the coccidial infection when the same causes the maximum inhibition of growth. Assuming, for instance, the mean weight increase of an infected-medicated group is 180 grams, and that of the non-infected and non-medicated birds is 200 gm., the ratio percentage of mean weight gain would be $$\frac{180}{200} \times 100 = 90$$

indicating that due to the beneficial action of the drug the subnormal growth occasioned by the infection fell only by 10%. If, by comparison, the mean weight gain of the infected, but not medicated controls is only 50%, it would show that the medication has checked the stunting effect of the disease to an extent of 40%. As will be seen from the tabulation, the percent ratios of mean weight deviations from the normal growth rate in the infected but untreated controls carry in some cases a minus sign which signifies that the infection has caused outright emaciation.

The "fecal score" is rated by a comparison of the appearance of the droppings between healthy and infected birds. The score is expressed in percentages and computed in the following manner. Beginning on the third or fourth and continuing through the eighth day after experimental inoculation the droppings of each bird are carefully examined and their deviations from the normal appearance are graded in accordance with accepted practice as outlined by R. R. Baron et al. in Poultry Science, vol XLV, No. 2, March 1966, p. 412. A fecal score of 0 indicates normalcy, while a rating of 4 denotes the maximum degree of deviation. The percent fecal score for each infected-medicated group is calculated on the basis of the maximal degree of the infection reached by each bird of the group within a given time. Assuming that in a group of 4 infected-untreated controls each bird shows the maximum score of 4 at the peak of the infection, the total score of the entire group would be 16. If, on the other hand, the four infected-medicated test animals would score a deviation of 1+2+2+2, the total score would be 7. The difference between the two totals divided by the maximum rating established for the infected-nonmedicated controls×100 represents the fecal score, thus $$\frac{9}{16} \times 100 \text{ or, rounded to the nearest } 5\% = 55\%$$

A fecal score of 55%, therefore, means that the droppings are 55% normal.

The experimental data on the coccidiostatic effect of our new compounds are summarized in the following tables. In light of the foregoing explanations the headings of the various columns are self-explanatory. It may be added that the mortality rate has been recorded both in terms of actual death losses and survival ratios referred to infected-untreated controls.

TABLE I

| Compound | Organism | No. birds | Conc. in feed | Percent ratio of mean wt. gains | Fec. score | Losses No. | Survival ratio, percent |
|---|---|---|---|---|---|---|---|
| 3-trifluoromethyl-5-nitrobenzamide | E. tenella | 4 | 0.00500 | 77.6 | 95 | 0 | 100 |
|  |  | 4 | 0.01000 | 91.8 | 100 | 0 | 100 |
|  |  | 4 | 0.01500 | 90.5 | 100 | 0 | 100 |
|  |  | 4 | 0.02000 | 100.3 | 100 | 0 | 100 |
|  |  | 4 | 0.03000 | 93.0 | 100 | 0 | 100 |
|  |  | 4 | 0.04000 | 65.8 | 100 | 0 | 100 |
| Infected Controls | do | 4 |  | 68.6 | 45 | 0 | 100 |
| 3-trifluoromethyl-5-nitrobenzamide | do | 4 | 0.00625 | 113.4 | 95 | 0 | 100 |
|  |  | 4 | 0.01250 | 117.0 | 100 | 0 | 100 |
|  |  | 4 | 0.02500 | 109.5 | 100 | 0 | 100 |
|  |  | 4 | 0.05000 | 69.0 | 100 | 0 | 100 |
| Infected Controls | do | 4 |  | 64.8 | 15 | 0 | 100 |
| 3-trifluoromethyl-5-nitrobenzamide | E. necatrix | 4 | 0.01000 | 84.5 | 50 | 1 | 75 |
|  |  | 4 | 0.01500 | 109.3 | 100 | 0 | 100 |
|  |  | 4 | 0.02000 | 88.5 | 100 | 0 | 100 |
|  |  | 4 | 0.02500 | 94.0 | 100 | 0 | 100 |
|  |  | 4 | 0.03000 | 87.1 | 100 | 0 | 100 |
|  |  | 4 | 0.04000 | 66.4 | 100 | 0 | 100 |
|  |  | 4 | 0.05000 | 73.8 | 100 | 0 | 100 |
| Infected Controls | do | 4 |  | −0.1 | 0 | 2 | 50 |
| 3-trifluoromethyl-5-nitrobenzamide | do | 4 | 0.00625 | 74.6 | 55 | 0 | 100 |
|  |  | 4 | 0.01250 | 97.7 | 90 | 0 | 100 |
|  |  | 4 | 0.02500 | 106.6 | 100 | 0 | 100 |
|  |  | 4 | 0.05000 | 59.2 | 100 | 0 | 100 |
| Infected Controls | do | 4 |  | 17.2 | 0 | 3 | 25 |
| 3-trifluoromethyl-5-nitrobenzamide | E. acervulina | 4 | 0.00625 | 49.0 | 30 | 0 | 100 |
|  |  | 4 | 0.01250 | 48.1 | 45 | 0 | 100 |
|  |  | 4 | 0.02500 | 44.8 | 70 | 0 | 100 |
|  |  | 4 | 0.05000 | 36.4 | 100 | 0 | 100 |
| Infected Controls | do | 4 |  | 43.3 | 0 | 0 | 100 |
| 3-trifluoromethyl-5-nitrobenzamide | E. brunetti | 4 | 0.00500 | 41.6 | 15 | 1 | 75 |
|  |  | 4 | 0.01500 | 63.4 | 45 | 0 | 100 |
|  |  | 4 | 0.02000 | 74.4 | 65 | 0 | 100 |
|  |  | 4 | 0.02500 | 73.6 | 45 | 0 | 100 |
|  |  | 4 | 0.03000 | 82.7 | 65 | 0 | 100 |
|  |  | 4 | 0.04000 | 79.8 | 100 | 0 | 100 |
|  |  | 4 | 0.05000 | 52.0 | 100 | 0 | 100 |
| Infected Controls | do | 4 |  | 3.8 | 0 | 2 | 50 |

TABLE II

| Compound | Organism | No. birds | Conc. in feed | Percent ratio of mean wt. gains | Fec. score | Losses No. | Survival ratio, percent |
|---|---|---|---|---|---|---|---|
| 3-trifluoromethyl-N-methyl-5-nitrobenzamide | E. tenella | 4 | 0.00625 | 73.7 | 15 | 1 | 75 |
|  |  | 4 | 0.01250 | 90.4 | 100 | 0 | 100 |
|  |  | 4 | 0.02500 | 104.0 | 100 | 0 | 100 |
| Infected Controls | do | 4 |  | 49.6 | 0 | 0 | 100 |
| 3-trifluoromethyl-N-methyl-5-nitrobenzamide | E. necatrix | 4 | 0.00625 | 74.8 | 45 | 1 | 75 |
|  |  | 4 | 0.01250 | 102.7 | 100 | 0 | 100 |
|  |  | 4 | 0.02500 | 100.4 | 100 | 0 | 100 |
| Infected Controls | do | 4 |  | 33.4 | 0 | 3 | 25 |
| 3-trifluoromethyl-N-methyl-5-nitrobenzamide | do | 4 | 0.05000 | 60.9 | 100 | 0 | 100 |
| Infected Controls | do | 4 |  | 14.6 | 0 | 2 | 50 |
| 3-trifluoromethyl-N-methyl-5-nitrobenzamide | E. acervulina | 4 | 0.02500 | 39.9 | 75 | 0 | 100 |
|  |  | 4 | 0.05000 | 37.9 | 90 | 0 | 100 |
| Infected Controls | do | 4 |  | 34.2 | 0 | 0 | 100 |
| 3-trifluoromethyl-N-methyl-5-nitrobenzamide | E. brunetti | 4 | 0.01250 | 89.0 | 45 | 0 | 100 |
|  |  | 4 | 0.02500 | 101.8 | 90 | 0 | 100 |
| Infected Controls | do | 4 |  | 24.1 | 0 | 1 | 75 |

TABLE III

| Compound | Organism | No. birds | Conc. in feed | Percent ratio of mean wt. gains | Fec. score | Losses No. | Survival ratio, percent |
|---|---|---|---|---|---|---|---|
| 3—trifluoromethyl-N,N-dimethyl-5-nitrobenzamide | E. tenella | 4 | 0.00625 | 92.6 | 30 | 0 | 100 |
|  |  | 4 | 0.01250 | 94.4 | 100 | 0 | 100 |
| Infected Controls | do | 4 |  | 49.6 | 0 | 0 | 100 |
| 3-trifluoromethyl-N,N-dimethyl-5-nitrobenzamide | do | 4 | 0.02500 | 100.1 | 100 | 0 | 100 |
|  |  | 4 | 0.05000 | 59.6 | 100 | 0 | 100 |
| Infected Controls | do | 4 |  | 24.2 | 0 | 2 | 50 |
| 3-trifluoromethyl-N,N-dimethyl-5-nitrobenzamide | E. necatrix | 4 | 0.00625 | 60.0 | 40 | 0 | 100 |
|  |  | 4 | 0.02500 | 100.3 | 100 | 0 | 100 |
| Infected Controls | do | 4 |  | −5.6 | 0 | 1 | 75 |
| 3-trifluoromethyhl-N,N-dimethyl-5-nitrobenzamide | do | 4 | 0.01250 | 82.6 | 95 | 0 | 100 |
| Infected Controls | do | 4 |  | 33.4 | 0 | 0 | 100 |
| 3-trifluoromethyl-N,N-dimethyl-5-nitrobenzamide | do | 4 | 0.05000 | 75.2 | 100 | 0 | 100 |
| Infected Controls | do | 4 |  | 14.6 | 0 | 2 | 50 |
| 3-trifluoromethyl-N,N-dimethyl-5-nitrobenzamide | E. brunetti | 4 | 0.02500 | 101.1 | 80 | 0 | 100 |
|  |  | 4 | 0.05000 | 83.6 | 100 | 0 | 100 |
| Infected Controls | do | 4 |  | 41.2 | 0 | 1 | 75 |

TABLE IV

| Compound | Organism | No. birds | Conc. in feed | Percent ratio of mean wt. gains | Fec. score | Losses No. | Survival ratio, percent |
|---|---|---|---|---|---|---|---|
| 3-trifluoromethyl-N-ethyl-5-nitrobenzamide | E. tenella | 4 | 0.01250 | 87.7 | 80 | 0 | 100 |
|  |  | 4 | 0.02500 | 95.1 | 100 | 0 | 100 |
| Infected Controls | do | 4 |  | 49.6 | 0 | 0 | 100 |
| 3-trifluoromethyl-N-ethyl-5-nitrobenzamide | do | 4 | 0.05000 | 76.3 | 100 | 0 | 100 |
| Infected Controls | do | 4 |  | 24.2 | 0 | 2 | 50 |
| 3-trifluoromethyl-N-ethyl-5-nitrobenzamide | E. necatrix | 4 | 0.01250 | 99.7 | 100 | 0 | 100 |
| Infected Controls | do | 4 |  | 33.4 | 0 | 0 | 100 |
| 3-trifluoromethyl-N-ethyl-5-nitrobenzamide | E. necatrix | 4 | 0.02500 | 105.8 | 100 | 0 | 100 |
|  |  | 4 | 0.05000 | 76.5 | 100 | 0 | 100 |
|  |  | 4 | 0.10000 | 8.4 | 100 | 0 | 100 |
| Infected Controls | do | 4 |  | 15.5 | 15 | 2 | 50 |
| 3-trifluoromethyl-N-ethyl-5-nitrobenzamide | E. acervulina | 4 | 0.05000 | 44.1 | 65 | 0 | 100 |
|  |  | 4 | 0.10000 | -13.6 | 100 | 0 | 100 |
| Infected Controls | do | 4 |  | 34.2 | 0 | 0 | 100 |
| 3-trifluoromethyl-N-ethyl-5-nitrobenzamide | E. brunetti | 4 | 0.01250 | 68.5 | 30 | 0 | 100 |
| Infected Controls | do | 4 |  | 24.1 | 0 | 1 | 75 |
| 3-trifluoromethyl-N-ethyl-5-nitrobenzamide | do | 4 | 0.02500 | 101.2 | 100 | 0 | 100 |
|  |  | 4 | 0.05000 | 91.8 | 100 | 0 | 100 |
|  |  | 4 | 0.10000 | 44.0 | 100 | 0 | 100 |
| Infected Controls | do | 4 |  | 41.2 | 0 | 1 | 75 |

TABLE V

| Compound | Organism | No. birds | Conc. in feed | Percent ratio of mean wt. gains | Fec. score | Losses No. | Survival ratio, percent |
|---|---|---|---|---|---|---|---|
| 3-trifluoromethyl-N,N-diethyl-5-nitrobenzamide | E. tenella | 4 | 0.01250 | 95.8 | 80 | 0 | 100 |
| Infected Controls | do | 4 |  | 49.6 | 0 | 0 | 100 |
| 3-trifluoromethyl-N,N-diethyl-5-nitrobenzamide | do | 4 | 0.02500 | 96.8 | 100 | 0 | 100 |
|  |  | 4 | 0.05000 | 77.1 | 100 | 0 | 100 |
|  |  | 4 | 0.10000 | 26.0 | 100 | 0 | 100 |
| Infected Controls | do | 4 |  | 24.2 | 0 | 2 | 50 |
| 3-trifluoromethyl-N,N-diethyl-5-nitrobenzamide | E. necatrix | 4 | 0.02500 | 107.0 | 100 | 0 | 100 |
| Infected Controls | do | 4 |  | -5.6 | 0 | 1 | 75 |
| 3-trifluoromethyl-N,N-diethyl-5-nitrobenzamide | do | 4 | 0.05000 | 46.9 | 90 | 0 | 100 |
| Infected Controls | do | 4 |  | 0 | 0 | 4 | 0 |
| 3-trifluoromethyl-N,N-diethyl-5-nitrobenzamide | E. acervulina | 4 | 0.05000 | 41.2 | 55 | 0 | 100 |
| Infected Controls | do | 4 |  | 1.9 | 0 | 0 | 100 |
| 3-trifluoromethyl-N,N-diethyl-5-nitrobenzamide | E. brunetti | 4 | 0.05000 | 55.7 | 90 | 0 | 100 |
| Infected Controls | do | 4 |  | -3.1 | 0 | 1 | 75 |

TABLE VI

| Compound | Organism | No. birds | Conc. in feed | Percent ratio of mean wt. gains | Fec. score | Losses No. | Survival ratio, percent |
|---|---|---|---|---|---|---|---|
| 3-trifluoromethyl-N-allyl-5-nitrobenzamide | E. tenella | 4 | 0.02500 | 106.0 | 55 | 0 | 100 |
|  |  | 4 | 0.05000 | 105.0 | 100 | 0 | 100 |
|  |  | 4 | 0.10000 | 107.2 | 100 | 0 | 100 |
| Infected Controls | do | 4 |  | 32.3 | 0 | 1 | 75 |
| 3-trifluoromethyl-N-allyl-5-nitrobenzamide | E. necatrix | 4 | 0.05000 | 92.5 | 100 | 0 | 100 |
|  |  | 4 | 0.10000 | 101.5 | 100 | 0 | 100 |
| Infected Controls | do | 4 |  | 15.5 | 15 | 2 | 50 |
| 3-trifluoromethyl-N-allyl-5-nitrobenzamide | E. brunetti | 4 | 0.05000 |  |  | 0 | 100 |
| Infected Controls | do | 4 |  |  |  | 1 | 75 |

TABLE VII

| Compound | Organism | No. birds | Conc. in feed | Percent ratio of mean wt. gains | Fec. score | Losses No. | Survival ratio, percent |
|---|---|---|---|---|---|---|---|
| 3-trifluoromethyl-N(2-chloroethyl)-5-nitrobenzamide | E. tenella | 4 | 0.01250 | 85.8 | 40 | 0 | 100 |
|  |  | 4 | 0.02500 | 100.5 | 100 | 0 | 100 |
| Infected Controls | do | 4 |  | 5.0 | 0 | 3 | 25 |
| 3-trifluoromethyl-N(2-chloroethyl)-5-nitrobenzamide | do | 4 | 0.02500 | 114.5 | 100 | 0 | 100 |
|  |  | 4 | 0.05000 | 106.5 | 100 | 0 | 100 |
|  |  | 4 | 0.10000 | 44.7 | 100 | 0 | 100 |
| Infected Controls | do | 4 |  | 32.3 | 0 | 1 | 75 |
| 3-trifluoromethyl-N(2-chloroethyl)-5-nitrobenzamide | E. necatrix | 4 | 0.01250 | 64.4 | 45 | 0 | 100 |
|  |  | 4 | 0.02500 | 101.6 | 100 | 0 | 100 |
| Infected Controls | do | 4 |  | 33.4 | 0 | 0 | 100 |
| 3-trifluoromethyl-N(2-chloroethyl)-5-nitrobenzamide | do | 4 | 0.05000 | 100.1 | 100 | 0 | 100 |
|  |  | 4 | 0.10000 | 65.9 | 100 | 0 | 100 |
| Infected Controls | do | 4 |  | 15.5 | 15 | 2 | 50 |
| -trifluoromethyl-N(2-chloroethyl)-5-nitrobenzamide | E. brunetti | 4 | 0.05000 | 66.9 | 45 | 0 | 100 |
| Infected Controls | do | 4 |  | 4.8 | 0 | 1 | 75 |

TABLE VIII

| Compound | Organism | No. birds | Conc. in feed | Percent ratio of mean wt. gains | Fec. score | Losses No. | Survival ratio, percent |
|---|---|---|---|---|---|---|---|
| 3-trifluoromethyl-N(2-methoxyethyl)-5-nitrobenzamide | E. tenella | 4 | 0.02500 | 97.8 | 75 | 0 | 100 |
| Infected Controls | do | 4 |  | 5.0 | 0 | 3 | 25 |
| 3-trifluoromethyl-N(2-methoxyethyl)-5-nitrobenzamide | do | 4 | 0.05000 | 116.1 | 100 | 0 | 100 |
|  |  | 4 | 0.10000 | 111.8 | 100 | 0 | 100 |
| Infected Controls | do | 4 |  | 32.3 | 0 | 1 | 75 |
| 3-trifluoromethyl-N(2-methoxyethyl)-5-nitrobenzamide | E. necatrix | 4 | 0.05000 | 109.1 | 90 | 0 | 100 |
|  |  | 4 | 0.10000 | 124.0 | 90 | 0 | 100 |
| Infected Controls | do | 4 |  | 28.3 | 0 | 3 | 25 |

TABLE IX

| Compound | Organism | No. birds | Conc. in feed | Percent ratio of mean wt. gains | Fec. score | Losses No. | Survival ratio, percent |
|---|---|---|---|---|---|---|---|
| 3-trifluoromethyl-5-nitrothiobenzamide | E. tenella | 4 | 0.01250 | 90.2 | 70 | 0 | 100 |
|  |  | 4 | 0.02500 | 98.9 | 95 | 0 | 100 |
| Infected Controls | do | 4 |  | 5.0 | 0 | 3 | 25 |
| 3-trifluoromethyl-5-nitrothiobenzamide | do | 4 | 0.02500 | 116.8 | 100 | 0 | 100 |
|  |  | 4 | 0.05000 | 100.2 | 100 | 0 | 100 |
|  |  | 4 | 0.10000 | 48.1 | 100 | 0 | 100 |
| Infected Controls | do | 4 |  | 32.3 | 0 | 1 | 75 |
| 3-trifluoromethyl-5-nitrothiobenzamide | E. necatrix | 4 | 0.02500 | 118.9 | 90 | 0 | 100 |
|  |  | 4 | 0.05000 | 99.6 | 90 | 0 | 100 |
|  |  | 4 | 0.10000 | 49.4 | 95 | 0 | 100 |
| Infected Controls | do | 4 |  | 28.3 | 0 | 3 | 25 |
| 3-trifluoromethyl-5-nitrothiobenzamide | E. brunetti | 4 | 0.05000 |  | 30 | 0 | 100 |
| Infected Controls | do | 4 |  |  | 0 | 0 | 100 |

TABLE X

| Compound | Organism | No. birds | Conc. in feed | Percent ratio of mean wt. gains | Fec. score | Losses No. | Survival ratio, percent |
|---|---|---|---|---|---|---|---|
| 3-trifluoromethyl-4-nitrobenzamide | E. tenella | 4 | 0.02500 | 64.9 | 70 | 0 | 100 |
|  |  | 4 | 0.05000 | 67.3 | 100 | 0 | 100 |
| Infected Controls | do | 4 |  | 39.9 | 0 | 1 | 100 |
| 3-trifluoromethyl-4-nitrobenzamide | E. necatrix | 4 | 0.05000 |  |  | 2 | 50 |
| Infected Controls | do | 4 |  |  |  | 4 | 0 |

TABLE XI

| Compound | Organism | No. birds | Conc. in feed | Percent ratio of mean wt. gains | Fec. score | Losses No. | Survival ratio, percent |
|---|---|---|---|---|---|---|---|
| 2-trifluoromethyl-4-nitrobenzamide | E. tenella | 4 | 0.01250 | 89.6 | 70 | 0 | 100 |
|  |  | 4 | 0.02500 | 104.2 | 100 | 0 | 100 |
| Infected Controls | do | 4 |  | 49.6 | 0 | 0 | 100 |
| 2-trifluoromethyl-4-nitrobenzamide | do | 4 | 0.02500 | 97.5 | 100 | 0 | 100 |
|  |  | 4 | 0.05000 | 81.1 | 100 | 0 | 100 |
|  |  | 4 | 0.10000 | 97.6 | 100 | 0 | 100 |
| Infected Controls | do | 4 |  | 24.2 | 0 | 2 | 50 |
| 2-trifluoromethyl-4-nitrobenzamide | E. necatrix | 4 | 0.01250 | 81.3 | 75 | 0 | 100 |
|  |  | 4 | 0.02500 | 100.7 | 95 | 0 | 100 |
| Infected Controls | do | 4 |  | 33.4 | 0 | 0 | 100 |
| 2-trifluoromethyl-4-nitrobenzamide | do | 4 | 0.05000 | 90.6 | 100 | 0 | 100 |
|  |  | 4 | 0.10000 | 101.8 | 100 | 0 | 100 |
| Infected Controls | do | 4 |  | 15.5 | 15 | 2 | 50 |
| 2-trifluoromethyl-4-nitrobenzamide | E. brunetti | 4 | 0.05000 |  | 45 | 0 | 100 |
| Infected Controls | do | 4 |  |  | 0 | 0 | 100 |

As will be seen from the foregoing tables, all of the eleven representative test compounds have at least a 2-species effect, while 7 have a 3-species range and 4 cover the full spectrum of the above described primary coccidiogenic factors. Three of the drugs afford an up to 100% protection at the exceedingly low level of 0.00625% while some of their homologues exhibit comparable potency at dosages between 100 and 1000 parts per million. For the proper evaluation of the experimental results it should be further understood that the values recorded for each of the three criteria of efficacy are in most instances not to be read in isolation from but in conjunction with each other in order to assign them their true significance. Thus, for example, in a sublethal infection the difference in survival ratios between test birds and controls may be 0. This, however, does not detract from the efficacy of the compound when due consideration is given to the fecal score together with the percent ratio of the mean weight gains which may be a multiple of those of the infected controls. On the other hand, in a given case the fecal score may not be higher than 40%, but the ratio of survival is 75% above the controls and the ratio of weight gains is seventeen fold that of the infected but untreated animals. It will, therefore, be seen that for correct interpretation the tabulated data must be related to and coordinated with each other, taking into account the pathological impact and the clinical syndrome of the disease which vary from species to species.

The preparation of the medicated feed compositions is carried out by intimately mixing the active ingredient with an orally ingestible carrier material, such as feed, in the amount of 5 to 95% by weight and introducing a proportionate quantity of this premix into the bulk of a commercial feed ration with thorough stirring and shuffling until a uniform blend of even distribution at the desired concentration level is obtained. Commercial feed rations of the type employed in our experiments included normal constituents in a mash or scratch supplemented with desirable amounts of vitamins, trace minerals, antibiotics, growth stimulants and preservatives.

To facilitate the handling of the small amounts of chemicals to be incorporated into the ultimate medicated ration the premix can also be prepared by grinding a limited quantity of a non-toxic inert vehicle with an amount from 5 to 95% by weight of the drug. In this case the carrier material may consist of fuller's earth, talcum, bentonite, ground oyster shells, limestone and divers clays, or edible feed substances such as soybean meal, wheat middlings and corn meal, and such stock concentrates are specifically made and adapted for use in dilutions with an edible carrier so as to compound the medicated rations at the desired dosage levels with utmost convenience. The availability of such concentrates is therefore highly desirable, if not indispensable, for the feed manufacturer and poultry raiser who ordinarily uses about one pound of the premix or concentrate for each ton of commercial feed to produce the finished medicated ration.

What we claim is:

1. A chemical compound represented by the formula

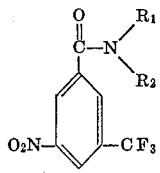

wherein $R_1$ and $R_2$ may be identical or different and stand for hydrogen, alkyl of 1–2 carbons, chloroethyl, allyl, and alkoxyethyl in which the alkoxy group has 1–4 carbon atoms.

2. 3-trifluoromethyl-5-nitrobenzamide.
3. 3-trifluoromethyl-N-methyl-5-nitrobenzamide.
4. 3-trifluoromethyl-N,N-dimethyl-5-nitrobenzamide.
5. 3-trifluoromethyl-N-ethyl-5-nitrobenzamide.
6. 3-trifluoromethyl-N,N-diethyl-5-nitrobenzamide.
7. 3-trifluoromethyl-N-allyl-5-nitrobenzamide.
8. 3-trifluoromethyl - N - (2-chloroethyl)-5-nitrobenzamide.
9. 3 - trifluoromethyl-N-(2-methoxyethyl)-5-nitrobenzamide.

References Cited

UNITED STATES PATENTS 3,052,603   1962   Hauptschein et al. ____ 260—521

OTHER REFERENCES

Caldwell et al.: J. Am. Chem. Soc., vol. 73, pp. 5125–26 (1951).

Smith: Open-Chain Nitrogen Compounds, vol. 1, p. 212 (1965), QD 412 NIS6.

Yagupolskii et al.: J. of General Chemistry of USSR, vol. 35 (1965), pp. 976–82.

HENRY R. JILES, Primary Examiner

H. I. MOATZ, Assistant Examiner

U.S. Cl. X.R.

260—551, 544; 424—324